(12) United States Patent
Drozt et al.

(10) Patent No.: US 9,450,991 B2
(45) Date of Patent: Sep. 20, 2016

(54) METHOD OF CONTROLLING SHARING OF PARTICIPANT IDENTITY IN A GROUP COMMUNICATION SESSION

(75) Inventors: Peter M. Drozt, Prairie Grove, IL (US); Anatoly Agulnik, Deerfield, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 553 days.

(21) Appl. No.: 12/957,140

(22) Filed: Nov. 30, 2010

(65) Prior Publication Data

US 2012/0135775 A1    May 31, 2012

(51) Int. Cl.
  *H04B 7/00* (2006.01)
  *H04L 29/06* (2006.01)
  *H04W 4/08* (2009.01)
  *H04W 4/10* (2009.01)
  *H04W 12/02* (2009.01)

(52) U.S. Cl.
  CPC ......... *H04L 65/403* (2013.01); *H04L 63/0407* (2013.01); *H04L 63/104* (2013.01); *H04L 65/1006* (2013.01); *H04W 4/08* (2013.01); *H04W 4/10* (2013.01); *H04W 12/02* (2013.01)

(58) Field of Classification Search
  CPC ....... H04W 4/10; H04W 12/02; H04W 4/08; H04W 12/06; H04M 2203/2066; H04B 7/18513
  USPC .......................................................... 455/518
  See application file for complete search history.

(56) References Cited

U.S. PATENT DOCUMENTS

| | | | |
|---|---|---|---|
| 2006/0234692 A1 | 10/2006 | Shimokawa et al. | |
| 2007/0133435 A1* | 6/2007 | Eneroth et al. | 370/260 |
| 2008/0037574 A1 | 2/2008 | Huh et al. | |
| 2010/0234057 A1* | 9/2010 | Drozt et al. | 455/518 |
| 2011/0154446 A1 | 6/2011 | Drozt | |

FOREIGN PATENT DOCUMENTS

| | | |
|---|---|---|
| WO | 2005122470 A1 | 12/2005 |
| WO | 2010104668 A2 | 9/2010 |

OTHER PUBLICATIONS

PCT International Search Report and Written Opinion for Application No. PCT/US2011/058360 dated Apr. 27, 12.
Extended European Search Report dated Dec. 4, 2014 for counterpart application EP11844399.3 related to PCT/US2011/058360.
Patent Examination Report No. 1 dated Oct. 22, 2014 for counterpart Australian application 2011337104.

* cited by examiner

*Primary Examiner* — Ankur Jain

(57) ABSTRACT

A system and methods for increasing the granularity of privacy control in a group communication session are presented. A privacy rule is established for a participant in the session. The privacy rule specifies for different identity sharing triggers whether the participant identity is to be shared with other participants in the session. The privacy of the participant is able to be different dependent on the particular identity sharing trigger. The privacy rule is set by participant initiating the session, a separate server, or the participant. In the last case, the participant is able to specify privacy for a media or data stream when requesting the floor to transmit the stream. The identity of the participant is automatically modified dependent on session context information.

19 Claims, 6 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|0 0 0 0 0| PT=APP=204 |            length                |
+-+-+-+-+-+-+-+-+-+-+-+-+-+-+-+-+-+-+-+-+-+-+-+-+-+-+-+-+-+-+-+-+
|SSRC of PoC Client requesting permission to send a Media Burst |
+-+-+-+-+-+-+-+-+-+-+-+-+-+-+-+-+-+-+-+-+-+-+-+-+-+-+-+-+-+-+-+-+
|                         name=PoC1                             |
+-+-+-+-+-+-+-+-+-+-+-+-+-+-+-+-+-+-+-+-+-+-+-+-+-+-+-+-+-+-+-+-+
|MB-priority   | MB-priority   |       MB-priority value        |
|-level = 102  | -length = 2   |                                |
+-+-+-+-+-+-+-+-+-+-+-+-+-+-+-+-+-+-+-+-+-+-+-+-+-+-+-+-+-+-+-+-+
|Time-stamp    | Time-stamp    |                                |
| = 103        | -length = 8   |                                :
.                         Time stamp value                      .
+-+-+-+-+-+-+-+-+-+-+-+-+-+-+-+-+-+-+-+-+-+-+-+-+-+-+-+-+-+-+-+-+
|Privacy       | Privacy       |         Privacy value          |
| = 120        | -length = 2   |                                |
+-+-+-+-+-+-+-+-+-+-+-+-+-+-+-+-+-+-+-+-+-+-+-+-+-+-+-+-+-+-+-+-+
```

*FIG. 4*

```
<?xml version="1.0" encoding="UTF-8"?>
<identity_limit xmlns="urn:oma:params:xml:ns:poc:identity_limit">
    <session_initiate>hide</session_initiate>
    <voice>share</voice>
    <video>hide</video>
    <image>hide</image>
    <ptz>share</ptz>
</identity_limit>
```

502 — (first two lines)
504 — (session_initiate through ptz block)

FIG. 5

METHOD OF CONTROLLING SHARING OF PARTICIPANT IDENTITY IN A GROUP COMMUNICATION SESSION

TECHNICAL FIELD

The present disclosure relates generally to communication systems and in particular to a system and method of controlling privacy in a communication session.

BACKGROUND

Portable radio transceivers or "walkie-talkies" are able to establish either one-to-one or one-to-many communication links. Such radio transceivers are indispensable for law enforcement, rescue, and military personnel, and have even become commonplace across various business environments as well as for recreational activities. In particular, radio transceivers provide a near instantaneous connection between users in a talk group by utilizing push to talk (PTT) communications over a half-duplex radio transmission system, for example, over a circuit-switched network. Half-duplex radio transmission systems provide two-way communication on a single radio channel thus limiting speaking privileges to one user at a time. Therefore, requests to speak in a PTT communication session are handled by a floor control mechanism at a PTT server.

Recent advances in cellular packet-switched networks have resulted in the development of a push to talk over cellular (PoC) solution, for example, as described in PoC V2.0 Enabler Package released Sep. 22, 2009 by Open Mobile Alliance (OMA). Specifically, a PoC network provides a half-duplex voice over internet protocol (VoIP) solution, with well-known PTT functionality. PoC may be implemented on an internet protocol multimedia subsystem (IMS) platform, as described in 3GPP Technical Specification (TS) 23.228, and any subsequent revisions. The floor control mechanism in a PoC system resides in a PoC server above the IMS platform. Moreover, PoC employs familiar protocols for voice and control signaling, including Real-Time Transport Protocol (RTP), as described, for example, in Request for Comments (RFC) 3550 dated July 2003 by Internet Engineering Task Force (IETF), and any subsequent revisions, and Session Initiation Protocol (SIP), for example, as described in RFC 3261 published June 2002 by IETF Network Working Group and any subsequent revisions.

Typically, the identity of the transmitter is transmitted in SIP messages or floor control messages to convey the identity of a user. The received ID code is then associated with a particular user by matching the ID code with a registered user in a memory of the receiver and then displayed at the receiver. During a communication session that supports a privacy feature, such as during a PoC communication session, it may be desirable to hide the user's identity from other participants of the communication session. Presently, a group participant is able to request anonymity when initiating or joining a communication session. Once anonymity is requested, the participant's identity is hidden for all instances during the communication session.

However, it may be desirable during a group communication session to hide a participant's identity under certain circumstances and to show the same participant's identity under other circumstances. Accordingly, there is a need for a system and method of increasing the granularity of controlling identity privacy in a group communication session.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

FIG. 4 illustrates one embodiment of a modified request from a participant for requesting the floor.

FIG. 5 illustrates one embodiment of an XML computer-readable code.

Figure 1:
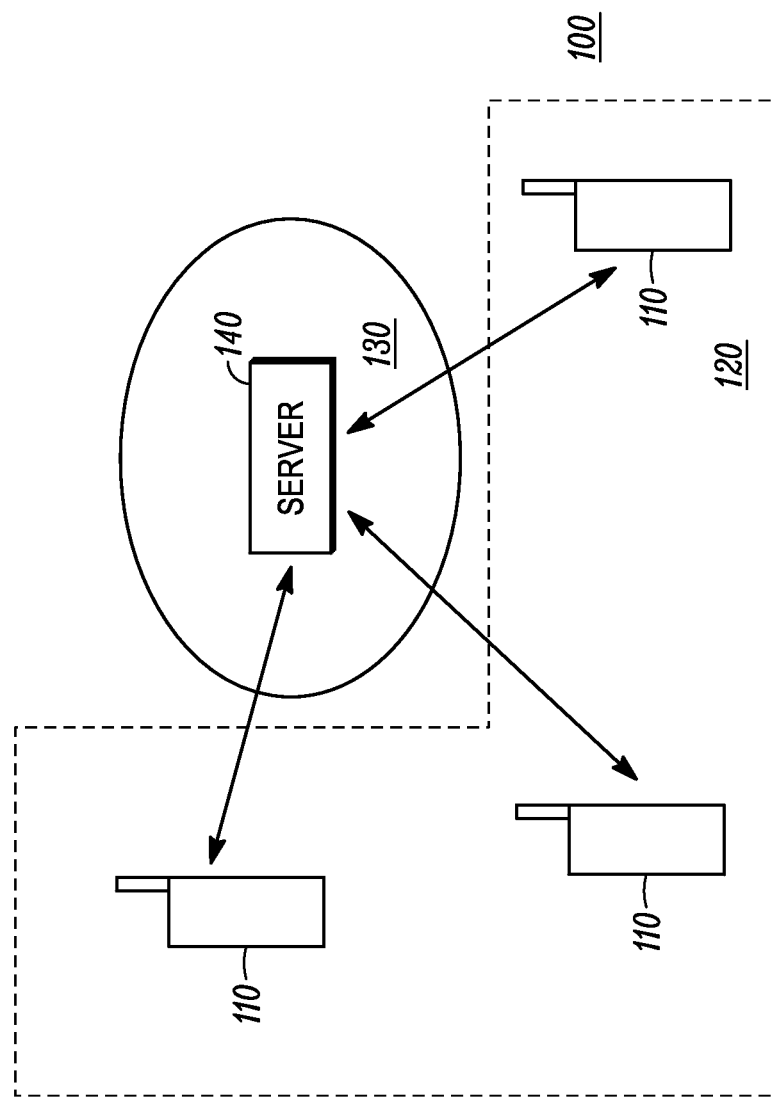
FIG. 1 illustrates one embodiment of a communication system.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Systems and methods having increased granularity of privacy control in a group communication session, such as in a PTT communication session, are disclosed. The set of privacy rules for the participants in the group communication session are able to be set individually. Each privacy rule, which specifies whether the identity of a particular participant is to be shared for each of a plurality of identity sharing triggers, is able to be set independent of the other privacy rules and whether the identity is to be shared is able to be set independently for each identity sharing trigger in a privacy rule. This permits the identity of a participant to be revealed to other participants in some instances while remaining hidden in other instances. Thus, when different types transmissions (e.g., anything sourced from a participant such as session initiation/join requests, media and control streams) of the group communication session are distributed to other participants in the group communication session, whether the participant is identified or hidden to the other participants in relation to these transmissions is able to be different for the different transmissions.

As used herein, the terms "identity" or "identity information" refers to data used to define or distinguish one participant apart from another and may include a participant's attributes, characteristics, designations, name, unique identifier, and other participant related information. Also, as used herein, the term "privacy rule" refers to actions or protocols for controlling how a participant's identity is shared with or provided to other participants during a communication session. A "communication session" means a relationship among participants that is established using call control protocols (such as SIP, for instance, or any other standard or proprietary call control protocol), wherein the established relationship is used to exchange media (e.g., voice, data, video, image) among the participants. A "participant" refers to a user of a communication device participating in the session as well as the associated communication device. The term "identity sharing triggers" means the different circumstances under which a participant's identity may be displayed to other participants of the communication session. Examples of various identity sharing triggers are provided below in more detail. The participants are members of a group or "talk group" that include preconfigured or ad hoc users or members. Further, each participant engages in a communication session by way of any combination of communication devices containing hardware and software and/or firmware as discussed below.

The various embodiments of the system and method disclosed herein include multiple participants in the group communication session and may further include a server. A privacy rule with identity sharing triggers of each participant in a group communication session is set individually. Thus, identity sharing within the group communication session is able to be set independently for each participant and each identity sharing trigger. A default privacy rule of a particular participant may be set by various entities at different times and may be overridden dependent on overall privacy policy considerations. The identity sharing triggers include sharing the participant's identity in at least some of: a listing of session participants, as the initiating participant, as the source of a particular media stream or command/control information during the group communication session, or as a participant with special privileges a specific function.

The systems and methods of controlling privacy in a communication session herein are compliant with established standards and protocols, such OMA PoC, RTP, and SIP. However, the embodiments herein are not limited by these protocols. At times, the embodiments are described with reference to one or more participants for the sake of clarity in understanding the embodiment; however, the embodiments as disclosed can generally be applied to any arbitrary number of participants and/or groups of participants, including predetermined lists of users, predetermined or preconfigured groups of participants and/or groups of participants, and ad hoc groups. Further, the benefits and advantages as described are applicable to any combination of servers, networks, participants, and other devices comprising hardware and software and/or firmware that are capable of supporting the embodiments disclosed below. Those skilled in the art will realize that the above recognized advantages and other advantages described herein are merely illustrative and are not meant to be a complete rendering of all of the advantages of the various embodiments.

FIG. 1 illustrates a communication system 100 capable of supporting a group communication session 120 such as a PTT communication session. The communication system 100 includes communication devices 110 that are in communication through an infrastructure 130. The infrastructure 130 contains distributed elements, some local to each other and others disposed geographically distant from each other. Such elements may include a server 140 as well as bridges, switches, zone controllers, base station controllers, repeaters, base radios, base transceiver stations, base stations, access points, routers or any other type of infrastructure equipment facilitating communications between entities in a wireless or wired environment and many other elements known in the art but not shown or described herein for brevity. The communication device 110 can be, for example, a cellular telephone, personal digital assistant, or a mobile (personal or vehicular) communication device used by emergency personnel. The communication devices 110 may be in wired or in wireless communication with the server 140. The server 140 can be a single device or multiple devices that collaboratively or independently support a communication session.

Devices in the communication system 100, including the communication devices 110 and the server 140, generally comprises a memory (e.g., a database), one or more network interfaces, and a processor that are operatively coupled, and which when programmed form the means for the device to implement its functionality. The interfaces are used to send information to and receive information from other devices in the communication system 100 for carrying out a device's intended functionality. The implementation of the network interfaces in a given device depends on the particular type of network, i.e., wired and/or wireless, to which the device is connected. For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processor of the particular device through programmed logic such as software applications or firmware stored on the memory of the device.

Figure 2:
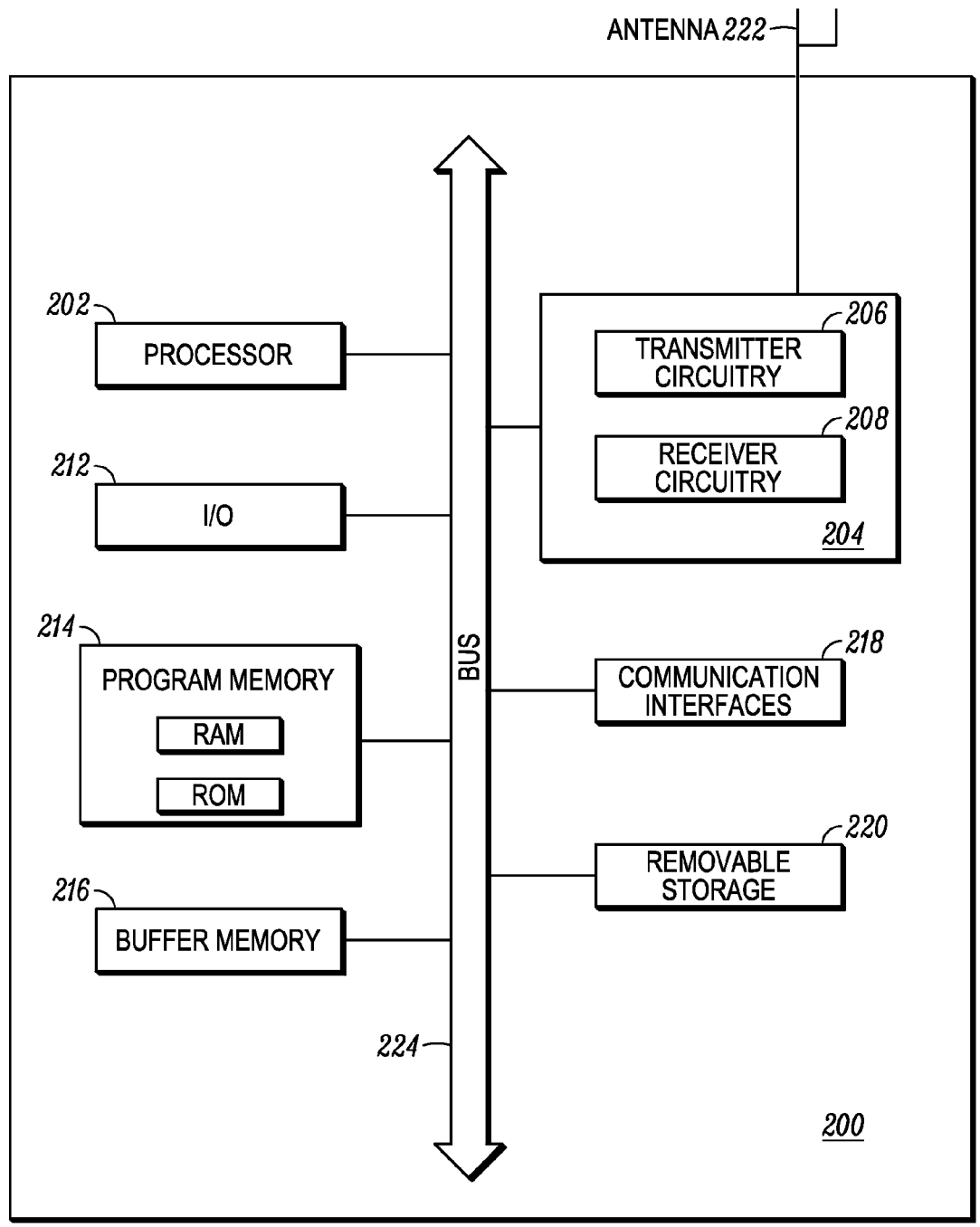
FIG. 2 illustrates one embodiment of a communication device.

An embodiment of one of the devices is shown in the block diagram of FIG. 2. The communication device 200 may contain, among other components, a processor 202, a transceiver 204 including transmitter circuitry 206 and receiver circuitry 208, an antenna 222, I/O devices 212, a program memory 214, a buffer memory 216, one or more communication interfaces 218, and removable storage 220. The transmitter circuitry 206 and receiver circuitry 208 allow the communication device to act as a transmitter (transmitting information) or a receiver (receiving information), as desired. The communication device 200 is preferably an integrated unit and may contain at least all the elements depicted in FIG. 2 as well as any other element necessary for the communication device 200 to perform its electronic functions. The electronic elements are connected by a bus 224.

The processor 202 includes one or more microprocessors, microcontrollers, DSPs, state machines, logic circuitry, or any other device or devices that process information based on operational or programming instructions. Such operational or programming instructions are stored in the program memory 214 and may include instructions such as estimation and correction of a received signal and encryption/decryption that are executed by the processor 202 as well as information related to the transmit signal such as modulation, transmission frequency or signal amplitude. The program memory 214 may be an IC memory chip containing any form of random access memory (RAM) and/or read only memory (ROM), a floppy disk, a compact disk (CD) ROM, a hard disk drive, a digital video disk (DVD), a flash memory card or any other medium for storing digital information. One of ordinary skill in the art will recognize that when the processor 202 has one or more of its functions performed by a state machine or logic circuitry, the memory 214 containing the corresponding operational instructions may be embedded within the state machine or logic circuitry. The operations performed by the processor 202 and the rest of the communication device 200 are described in detail below.

The transmitter circuitry 206 and the receiver circuitry 208 enable the communication device 200 to respectively transmit and receive communication signals. In this regard, the transmitter circuitry 206 and the receiver circuitry 208 include appropriate circuitry to enable wireless transmissions. The implementations of the transmitter circuitry 206 and the receiver circuitry 208 depend on the implementation of the communication device 200 and the devices with which it is to communicate. For example, the transmitter and receiver circuitry 206, 208 may be implemented as part of the communication device hardware and software architecture in accordance with known techniques. One of ordinary skill in the art will recognize that most, if not all, of the functions of the transmitter or receiver circuitry 206, 208 may be implemented in a processor, such as the processor 202. However, the processor 202, the transmitter circuitry 206, and the receiver circuitry 208 have been artificially partitioned herein to facilitate a better understanding. The buffer memory 216 may be any form of volatile memory, such as RAM, and is used for temporarily storing received or transmit information.

The communication device 200 may also contain a variety of I/O devices such as a keyboard with alpha-numeric keys, a display (e.g., LED, OELD) that displays information about the communication device or communications connected to the communication device, soft and/or hard keys, touch screen, jog wheel, a microphone, and a speaker.

Turning back to FIG. 1, the communication server (server) 140 administers one or more communication sessions. For example, the server 140 facilitates floor control and media flow with a plurality of participants engaged in one or more PTT communication sessions. The database of the server 140 includes information related to participants, such as identity information. The database may include an overall privacy policy, as well as attributes for individual participants in the various group communication sessions administered by the communication server such as participant identity, active group communication sessions, agency affiliation (i.e., police, fire, government), role (e.g., hierarchical rank such as captain, sergeant, commander, chief, or job function as is defined for use in the group communication session such as a specific expert for the group communication session), rank in each active group communication session, group membership information and identity privacy aspects for each group communication session with which the participant is currently involved. The server 140 may contain a PoC server and an XML document management server (XDM). The server 140 may contain the above information stored in one or more XML documents within the XDM server.

The communication system 100 comprises a system capable of providing PTT communication, whereas the server 140 implements an identity privacy function. Thus, the server 140 is PoC server or any other type of server capable of controlling how a participant's identity is shared with other participants during a communication session.

Although the server 140 is shown in FIG. 1 as being part of the infrastructure 130, in other embodiments it is part of a mobile network coupled to the infrastructure 130. The infrastructure 130 may include an internet protocol (IP)-based radio access network (IP-based RAN), a local area network (LAN)/wide area network (WAN) Enterprise or IMS environment.

Turning now to identity sharing triggers of a group communication session, there are a number of circumstances under which the identity of the participant may be shared with the other participants. Normally, the participant's identity is shown on the displays of other participants when a participant becomes active in a group communication session. One example of these aspects includes the identity of the participant who initiated the group communication session. Another example is the identity of a participant granted the floor to source each media stream received either simultaneously or non-contemporaneously during the group communication session. Note that as defined herein, the floor can be granted for audio and visual media streams as well as data (control) streams. The identities of the participants may be shown in a list of session participants. Other instances in which the identity of a participant may be shared with other participants include indicating the participant having special privileges or a specific function. An example of a specific function includes control over a particular piece of equipment, such as PTZ (pan-tilt-zoom) control or DVR (digital video recorder) control. It is beneficial to be able to independently change whether or not the participant identity is displayed for each identity sharing trigger for various reasons.

In one example, it may be acceptable for a participant to be identified as the participant of in a group communication session but unacceptable (either from the participant's standpoint or from a policy standpoint) for the participant to be identified when talking. Thus, when the participant joins the session, the identity of the participant is shared with the other participants as part of the list of participants. However, when the participant transmits audio, the identity of the participant is hidden from the recipients on the display.

In another example, a group communication session may include multiple streams including media streams, such as an audio stream or a video stream, an isolated image and/or text. However, it may not be desirable to share the identity of the participant of the device sourcing one or more of these media streams. However, identification of the source of a video stream (especially when the video stream does not contain facial images of the participant) may not automatically exist, in which case providing the identity of the video stream can be critical in emergency situations. Alternatively, the identity of the participant sourcing the audio stream may be displayed but the identity of the participant sourcing the video stream may be hidden for security reasons.

In another example, a communication session may have a video stream and a data stream that provides the ability for a participant to control the pan, tilt, and zoom (PTZ) of the camera sourcing the video stream. In this case, if a participant is the source of the video stream, it may not be desirable for the participant to be the source of the video stream, especially if the participant is obtaining the video stream from another source. However, if the participant is also able to use a data stream to send PTZ commands which affects the video stream being distributed, it may be important for the identity of the participant that has been granted to ability to send PTZ commands to be distributed to the other participants.

In still another example, it may be desirable for the various participants in a communication session to know who has joined the session but to have all other specific identity information for those participants to remain anonymous for security reasons.

Security issues and/or identity confusion may result when devices are shared among non-registered participants or are used by a different registered participant (i.e., the actual participant is using the device of another participant). As the identity of a user is linked to a particular device as described below, the incorrect participant will be displayed on the other participants' displays thereby causing potential confusion. This is also true when a device is misappropriated and used by an undesirable third party, thereby leading not only to identity confusion but also security issues until the device can be deregistered.

In instances such as the above, a centralized entity such as the server may retain knowledge of each group communication session for which it is responsible and provides a set of privacy rules (a privacy rule for each participant) for each group communication session. The privacy rules of a particular group communication session are either established for all participants of the particular group communication session or are individualized for each participant of the particular group communication session. One such set of privacy rules may be that the identity of a specific participant of the particular group communication session is hidden as the session initiator and when sourcing an image or video stream, but is shown when sourcing an audio stream or when given PTZ control.

The set of privacy rules used for a particular session may be predefined as a default set of privacy rules by a network policy. These default privacy rules may be configurable by one or more of the participants or may be unable to be reconfigured unless by a system administrator. Also, the network may permit only a limited subset of the default set of privacy rules to be adjusted. For example, network policy may allow the participant sourcing a data stream such as PTZ control, the list of participants and the initiating participant to be identified or remain anonymous while constraining participants sourcing specific media streams to always remain hidden. The server may set the default set of privacy rules for the session or it may be established by a separate controller.

The network policy may also permit only specific participants to adjust the set of privacy rules of the group communication session. For example, only the participant initiating the group communication session may be enabled to change the privacy rule for each participant of the group communication session. Alternatively, the default set of privacy rules and/or the set of privacy rules established by the initiating participant may be overridden by a participant of the group communication session having a higher rank. For example, in an emergency situation the initiating participant may be a police patrolman who may not have the time or inclination or authority to adjust the set of privacy rules (or their own privacy rule) as may be necessary. When a sergeant joins the group communication session, the sergeant may enable further participants to join (such as camera feeds or other emergency services that may not be available to the patrolman) and may correspondingly adjust the set of privacy rules to take into account the new participants in addition to adjusting the existing set of privacy rules.

In another embodiment, the initiating participant and participant information are initially identified. Requests to obtain the floor for sourcing voice, video, or other media or data streams are augmented by each participant to specifically indicate whether the identity of the source is to be shared or hidden independent from the privacy setting at the session setup.

Figure 3:
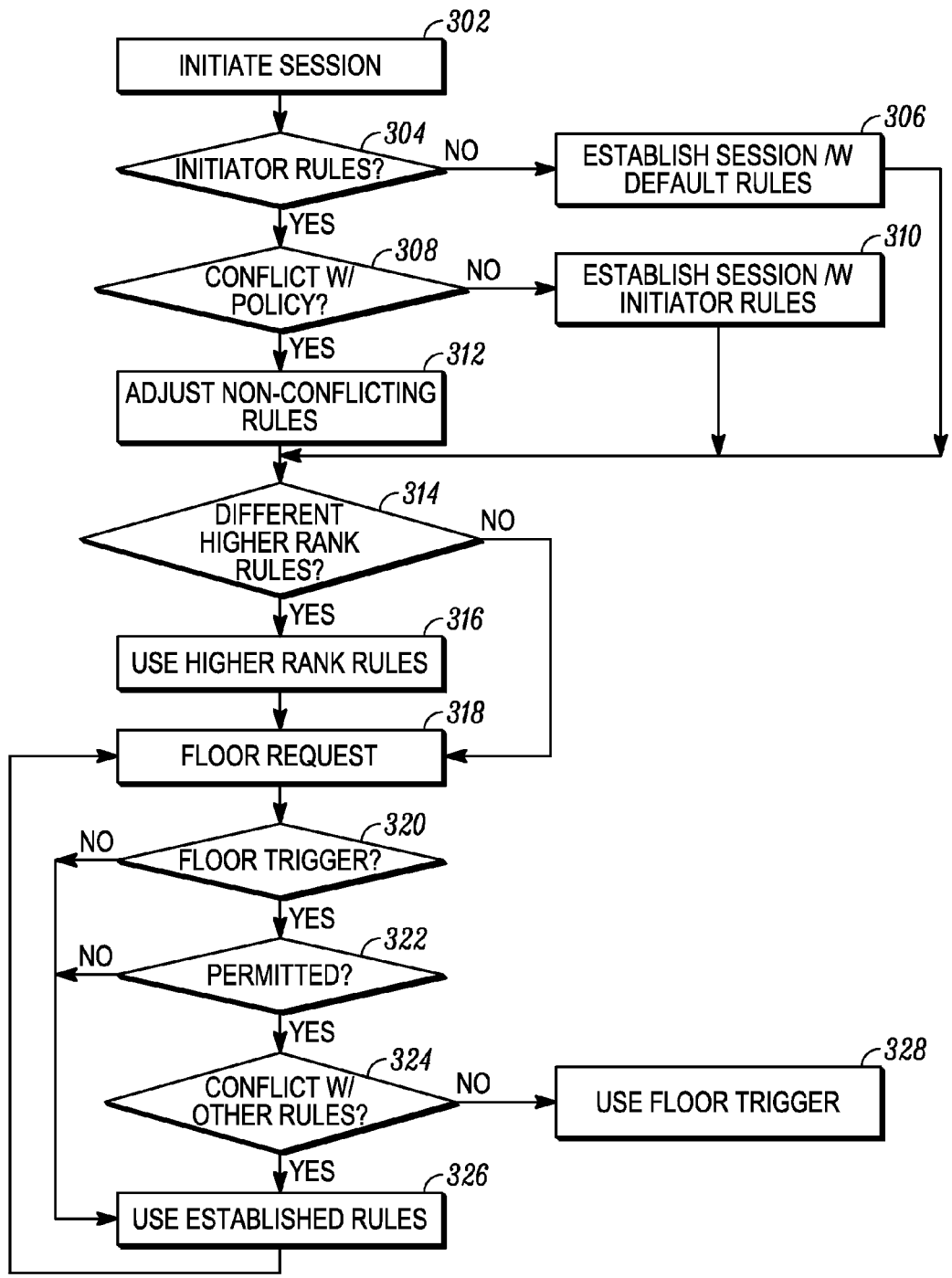
FIG. 3 illustrates one embodiment of a method of establishing a set of privacy rules for a group communication session.

FIG. 3 illustrates one embodiment of a method of providing a set of privacy rules for a group communication session. Not all of the steps may be present, and some of the steps may be performed by different entities. The method begins at step 302 by a group communication session being initiated by an initiating participant. The initiating participant may or may not supply a requested set of privacy rules (i.e., for some or all intended participants) or may or may not supply a requested privacy rule just for themselves to the server at step 304. Additionally, the privacy rule for the initiating participant (or for each participant) may contain only some of the identity sharing triggers of the ultimate privacy rule, e.g., indicating only at the outset whether the identity of the initiating participant is to be shared as a session participant and/or as the initiating participant. For convenience, the remainder of the description refers to a set of privacy rules, with the understanding that in other embodiments, only one privacy rule (that of the initiating participant or fewer than all of the privacy rules in the set of privacy rules) may be used instead of the set of privacy rules.

If the initiating participant does not supply a requested set of privacy rules, at step 306 the server establishes the communication session using a default set of privacy rules. These default privacy rules may be stored in the various participants and merely indicated as to be used or may be transmitted to the participants from the server each time a group communication session is initiated. In different embodiments, the server may indicate to the initiating participant and other participants that a default set of privacy rules are in effect or may simply apply the set of privacy rules so that the process is transparent to the participants.

If the initiating participant supplies the requested set of privacy rules at step 304, at step 308 the server or other controller determines whether the requested set of privacy rules conflict with a network privacy policy. If it is determined at step 308 that at least one of the requested set of privacy rules do not conflict with a network privacy policy, at step 310 the server uses the requested set of privacy rules. In different embodiments, the server may indicate to the initiating participant and other participants that the requested set of privacy rules are in effect or, as above, this may be transparent. If it is determined at step 308 that at least one of the requested set of privacy rules conflict with the network privacy policy, at step 312 the server uses at most only the non-conflicting requested privacy rules in the requested set of privacy rules along with the other, default policy-based privacy rules. In different embodiments, the server may or may not indicate to the initiating participant and other participants which specific privacy rules are in effect (e.g., only the non-conflicting requested privacy rules along with the other, default policy-based privacy rules). In a different embodiment, if there is any conflict, the default set of privacy rules are used. In other embodiments, a privacy rule for a participant may be overridden or modified by the participant when the participant joins the communication session (or each later participant may provide its own privacy rule in a similar manner as above with regards to the initiating participant).

Once an initial set of privacy rules have been established (each privacy rule containing individual identity sharing triggers), at step 314 the highest ranking participant may override/modify some or all of the initial set of privacy rules. This may also be triggered based on policy, e.g., changing from a regular group call to an emergency group call if a participant of a particular rank joins the communication session. If so, at step 316, the higher ranking participant may override the set of privacy rules before the group communication session is established and the first floor granted, when the higher ranking participant joins the group communication session, or sometime later in the middle of the group communication session. The initiating participant may also override the initial set of privacy rules in the middle of the group communication session. Both the initiating participant and the higher ranking participant may still be subject to the policy considerations that may modify the requested set of privacy rules, however.

After the group communication session has been established, at step 318 a participant requests the floor (e.g., to source a media stream). If at step 320 the request does not contain an identity sharing trigger related to the media stream and for that participant, the identity sharing trigger in the previously established privacy rule for that participant (in the previously established set of privacy rules above) are used at step 326. If the request contains the identity sharing trigger at step 320, it is received by the server/controller. At step 322, the server determines whether the participant is allowed to change the privacy rule to use the identity sharing trigger in the floor request. If it is determined at step 322 that the participant is not allowed to change the privacy rule (or the specific identity sharing trigger), the previously established privacy rule is used at step 326. If it is determined at step 322 that the participant is allowed to change the privacy rule (or the specific identity sharing trigger), the server then determines at step 324 whether the new privacy rule for the participant (i.e., the change of the specific identity sharing trigger for the participant) conflicts with the policy considerations and if so the previously established privacy rules again are used at step 326. If the server determines at step 324 that the new privacy rule does not conflict with the policy considerations, at step 328 the requested identity sharing trigger is used and the process continues with the next (granted) floor request (which may be for the same as or different from the last floor). Thus, a similar process occurs when a participant joins a session as that described above when a participant initiates a session.

In other embodiments, rather than the server determining the various privacy rules, the privacy rules can be centrally controlled by a particular participant (such as the initiating participant or highest rank participant). Alternatively, as mentioned above, each participant may control its own rule and provide it to the server. Accordingly, in this last embodiment the initial privacy rule for a participant and list of permissions to change particular identity sharing triggers in that rule are stored in each participant and may be displayed to the user. The policy considerations may be included in the permission list so that even if a user of communication device would like to change his/her own identity sharing trigger in a particular case, the communication device would automatically override the selection if permission has not been granted. Alternately, if not permitted, the selection to change the identity sharing trigger may not be displayed to the user on the communication device.

Thus, a centralized entity such as the server or a particular participant may be responsible for establishing a uniform set of privacy rules for some or all participants. Alternatively, each participant may be responsible for establishing a privacy rule when transmitting a media stream.

Independent of how the privacy rule for the particular identity sharing trigger is generated, in one embodiment the server determines whether to include or not include an identity in a message relevant to a particular stream being supplied to participants. For example if a device requesting the floor to send voice asks for privacy, then the corresponding messages (e.g., "Floor Taken" messages from the server) would include an anonymous identity, regardless if this identity was provided in other messages or not. In another embodiment, the processor at the participant determines whether the identity of the participant sourcing the stream is to be displayed dependent on the particular stream and the participant sourcing the stream such that whether the identity of the participant is to be displayed is able to be different for different streams sourced by the participant. A display then displays the identity of the participant as the source of the stream when the identity of the participant is to be displayed as the source of the stream and otherwise indicates that the source of the stream is anonymous.

For example if a device requesting the floor to send voice and the privacy rule for this participants indicates the identity should not be shared, then the corresponding messages to inform the other participants that the floor has been granted would include an anonymous identity. In another embodiment, the processor at the participant determines whether the identity of the participant sourcing the stream is to be displayed dependent on the particular stream and the participant sourcing the stream such that whether the identity of the participant is to be displayed is able to be different for different streams sourced by the participant. A display then displays the identity of the participant as the source of the stream when the identity of the participant is to be displayed as the source of the stream and otherwise indicates that the source of the stream is anonymous FIG. 4 shows the contents of a modified MBCP Media Burst Request message from a participant for requesting the floor in a PoC session as defined by OMA PoC which is based on the RTCP APP packet as defined in RFC3550 and augmented to allow privacy to be requested. The "Privacy" parameters are added to the end of a message to indicate whether the identity of the requesting participant should be shared, hidden, or another appropriate value, such as for selective privacy. The values of the privacy parameter (shown as xxx) can be any number of digits and may be a simply binary 0 or 1. The other parameters are set by the standard: the version (V) field identifies the version of RTP, 2 in this example; the padding (P) bit is set to 0 as defined by OMA PoC; the next four bits form a subtype filed used to identify the specific floor control message (0000 indicates is this a Media Burst Request message as defined by OMA PoC); the packet type field (PT) includes the value 204 to indicate this is a RTCP APP packet as defined by RFC3550; the length field identifies the overall length of the message; the SSRC (Synchronization Source) field contains the SSRC value associated with the client requesting the floor; the Name field contains the ASCII string "PoC1" as defined by OMA PoC. The next three fields are optional and are used to convey a priority value to be associated with the request. In these optional fields, the MB-priority-level field has a value of 102, the MB-priority-length field has a value of 2, and the MB-priority value filed is a 16-bit parameter used to provide the specific priority. The next three fields are also optional and are used to convey a timestamp to indicate when the request was sent. These optional fields indicate that the Time-stamp field has a value of 103, the Time-stamp-length field has a value of 8, and the Time-stop value field consists of an 8-byte timestamp. The last three fields, as above, have been added to indicate where privacy should be provided. The Privacy field has a value of 120, the Privacy-length has a value of 2, and the Privacy value field indicates whether privacy is desired. For example, 0 may indicate the identify of the user requesting the floor should not be provided to any other participants, while a value of 1 may indicate the identify of the user requesting the floor should be provided to all the participants.

The participants may use SIP signaling during the communication session. In such a PoC communication session, the SIP signaling is used to initiate/terminate the communication session and modify the communication session, such as by adding/removing participants and by enforcing a set of privacy rules for the communication session. In this case, the communication system comprises a PoC communication system, including a SIP/IP core that, among others, manages routing of the SIP dialog between the PoC client and the PoC server. In such an embodiment, a media stream is transmitted between a participant and the server by using RTP. Participants in a PoC communication session are addressed by a SIP uniform resource identifier or other known manner.

FIG. 5 shows XML computer-readable code that identifies the cases in which the identity of a user will be shared and in which cases the identity of a user will be hidden in an XML body appended in a SIP INVITE request, a SIP OK response, and other equivalent SIP methods. Rather than a server being responsible for determining the set of rules, each participant may choose to specify this information independently as they join the session. Such an approach may be desirable in a public chat session. The XML source code, as shown in FIG. 5, specifies that the code is related to the privacy rule and the identity of the participant at code segment 502 and specifies identity sharing triggers (e.g., for various media streams) at code segment 504.

In an alternative embodiment, in addition to or rather than adding the additional body shown in FIG. 5 to SIP messages, the Session Description Protocol (SDP) may be augmented. Specifically, the SDP used to negotiate the media parameters for each media stream may be changed to include an indication whether the participant's identity should be shared or hidden when transmitting a particular stream.

It may also be desirable to automatically change the privacy setting associated with some of the identity sharing triggers (e.g., for the different streams) based on session context information. In this case, the privacy rule is thus modified without further input from the participant. Session context information defines features of the group communication session such as whether or not the group communication session is taking place during an emergency, whether participants of a certain role, specific job function or agency affiliation are present. For example, privacy setting may indicate that the identity of the current talker will be hidden for "normal" group sessions; however, if an emergency status is indicated (e.g., manually activated by any of the participants or remotely by the server), then the identity of the participant is always shown to all participants.

The identity sharing triggers, whether provided by a centralized set of rules or by each participant, also may specify individual participants for whom the identity sharing trigger is different from the normal participant. For example, the default identity sharing trigger of a participant sourcing a video stream may be for the sourcing participant to be anonymous to most participants but the identity may be provided to participant1, the participant having the highest rank in the communication session, and/or any participant whose role is of a certain overall rank (e.g., a lower level emergency service provider such as a police patrolman or fireman may not have the participant identity displayed but a higher level emergency service provider such as a police captain or fire chief may). For more details, see U.S. patent application Ser. No. 12/645,708, filed Dec. 23, 2009, titled "System And Method Of Controlling Identity Privacy In A Communication Session" by Drozt, et al. incorporated in its entirety by reference herein.

Figure 6:
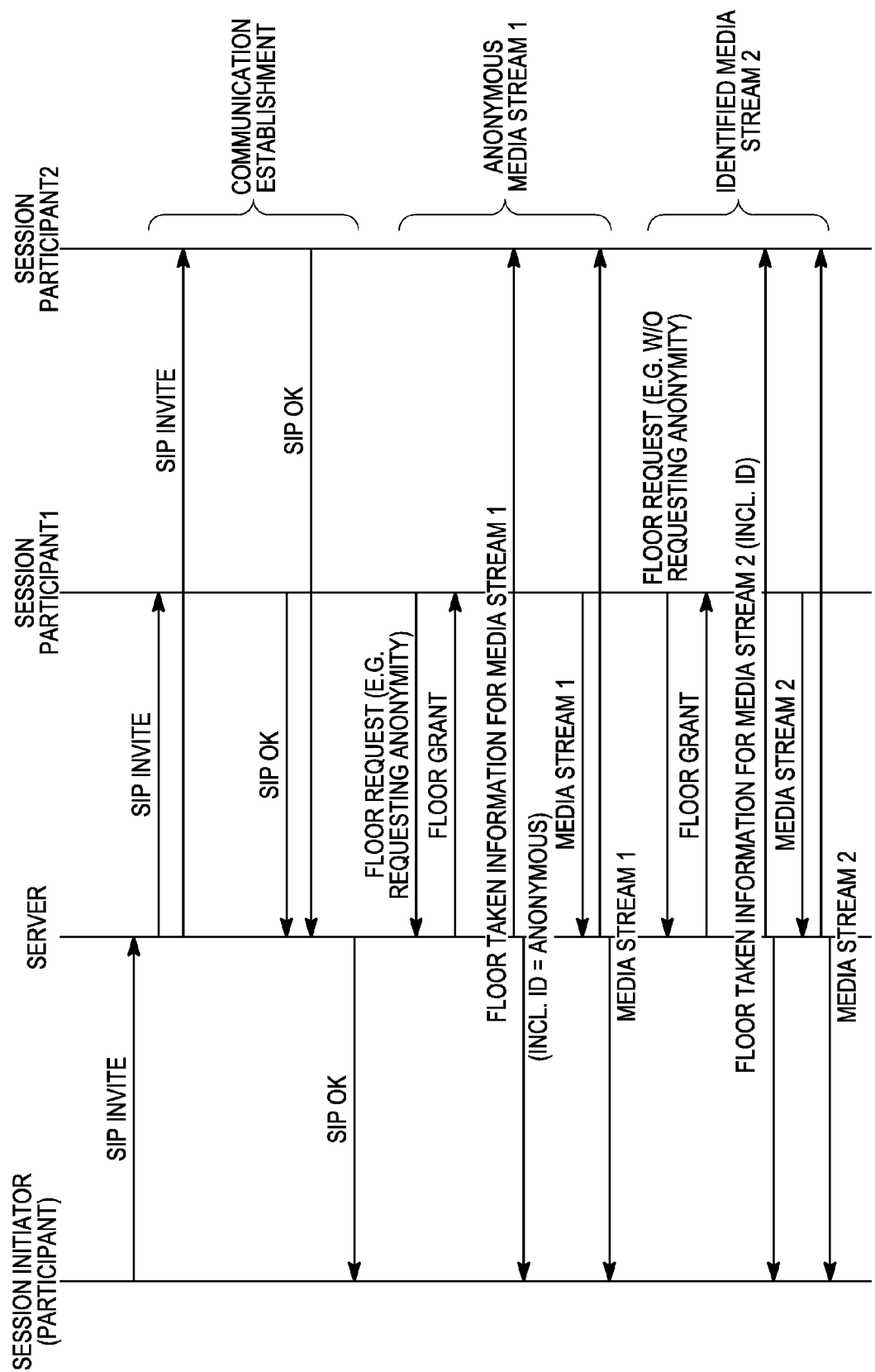
FIG. 6 illustrates one embodiment of a message sequence containing modified SIP messages.

FIG. 6 illustrates a typical message sequence containing the modified SIP messages of the described embodiments during a group communication session. The group communication session starts when a communication device initiates a group communication session. The communication device registers with the server, if not already registered and, in one embodiment, sends a SIP INVITE message to the server to initiate the communication session, thereby becoming a participant. As above, the SIP INVITE message includes a modified SDP and/or an XML body and may convey the privacy rule for the participant. As shown, the SIP INVITE message is received by the server, and in response the server sends SIP INVITE messages to other communication devices.

The other communication devices receive the SIP INVITE message and send back a SIP 200 OK message as a response to join the communication session. The SIP 200 OK message is transmitted to the server and, as above, may include a modified SDP and/or an XML body to convey the privacy rule for the participant sending the SIP 200 OK message. The server also sends the SIP 200 OK message indicating the privacy rules to the initiating participant. The communication session is thus started with the communication devices having initiated the session or responded with SIP 200 OK messages being participants in the communication session.

Later, one of the devices (as shown, participant 1) requests the floor for a particular media (/data) stream. This request may include a modified SDP and/or an XML body to convey the privacy rule (e.g., anonymity or ID display) for that particular media stream for the participant requesting the floor. The request is sent to the server (or controller), and a floor grant is sent to the requesting participant as well as floor taken information is sent to the other participants indicating that participant 1 has the floor for the particular media stream. Participant 1 then transmits the media stream to the other participants. As above, the SIP INVITE and OK and/or floor request can also carry privacy rule(s).

As illustrated, after the communication session has been established, Participant 1 requests the floor for media stream 1 and requests anonymity for this media stream. The server grants the request, sending a grant to Participant 1 as well as media stream 1 grant information to the other participants. This grant information in one embodiment does not contain the identity of Participant 1, merely indicating that the floor for media stream 1 has been granted to one of the participants. Participant 1 then sources media stream 1, which is provided to the other participants through the server without identifying Participant 1 as the source of media stream 1. Later, Participant 1 requests the floor for media stream 2 (which may be the same as or different from media stream 1) and does not request anonymity for this media stream. The server grants the request, sending a grant to Participant 1 as well as media stream 2 grant information to the other participants. This grant information contains the identity of Participant 1, indicating that the floor for media stream 2 has been granted specifically to Participant 1. Participant 1 then sources media stream 2, which is provided to the other participants through the server and Participant 1 is identified as the source of media stream 2.

The various embodiments of the system and method disclosed herein include multiple participants in a group communication session and may further include a server. The server may be in the infrastructure or may be part of a mobile network. A database of the server or of at least one participant maintains a set of privacy rules for various identity sharing triggers for each participant in the group communication session and identity information for the participants. The participant initiating the session may set an initial set of privacy rules. A participant requesting to join a group communication session or invited into a group communication session may be able to override the established set of privacy rules depending on the particular participant, modification permission and policy considerations. The privacy rule provided by an initiating participant or defined within the server may be used as a default privacy rule and applied only if a participant does not provide personal preferences. The privacy rule for the identity sharing triggers of a particular participant may be modified when the particular participant joins the session or at any point in time by the particular participant, by a different participant, or by the system before a particular media stream is provided. The privacy rule for the participant indicates which identity sharing triggers are hidden to which participants and which identity sharing triggers are accessible to which participants, as well as any special circumstances under which the privacy rule changes.

Although the various embodiments have been described in relation to merely hiding or showing the identity of a participant for different identity sharing triggers, further embodiments are possible. For example, a participant can be identified in different ways including just text such as "John Doe" or with a SIP URI such as "john@company.com" or more generally to capture a position, such as "group leader" or role, such as "moderator." In accordance with these various identities, the fields in FIGS. 4 and 5 may specify the specific identities of a participant to be hidden or to be shown to the other participants for the different identity sharing triggers. So when a participant joins a session, the user may want only his text name to be shared with the other participants. However, when sourcing a voice stream the user may want all his associated identities to be shown to the other participants. Such an embodiment can be effected using a greater range of numbers in FIG. 4 (e.g., 000=hide all, 111=show all, 001=show name only, 010=show SIP URI only, 011=show name and SIP URI, etc. . . . ) and an increased number of options for identity sharing triggers at code segment 504 in FIG. 5

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for controlling sharing of participant identity during a group communication session, the method comprising:
   receiving, at a server, a first communication from a source participant in the group communication session;
   first accessing, by the server, a set of privacy rules for participants in the group communication session, the set of privacy rules specifying whether, for each of a plurality of different sets of identity sharing circumstances, an identity of the source participant is to be shared or not shared with other participants in the group communication session;
   responsive to the first accessing of the set of privacy rules and as a function of a first set of identity sharing circumstances, one of sharing and not sharing, by the server, the identity of the source participant with the other participants and transmitting the first communication towards the other participants;
   receiving, at the server, a second communication from the source participant in the group communication session;
   second accessing, by the server, the set of privacy rules;
   responsive to the second accessing of the set of privacy rules and as a function of a second set of identity sharing circumstances different from the first set of identity sharing circumstances, the other of sharing and not sharing, by the server, the identity of the source participant with the other participants and transmitting the second communication towards the other participants;
   applying a default privacy rule to the source participant in response to determining that the participant did not provide its own privacy rule; and
   wherein different first and second sets of identity sharing circumstances include one or more of: whether a participant with special privileges has joined the group communication session, whether a participant or device with a specific function has joined the group communication session, whether a participant with a specific agency affiliation has joined the group communication session, and what type of media is being sourced by the source participant.

2. The method of claim 1, wherein the different first and second sets of identity sharing circumstances indicate whether to share or not to share the identity of the source participant with the other participants as a function of the type of media being sourced by the source participant, the type of media being selected from an audio stream, a video stream, an isolated image, and text.

3. The method of claim 1, wherein the set of privacy rules is set by an initiating participant of the group communication session, and the source participant is different from the initiating participant.

4. The method of claim 1, wherein the set of privacy rules is set by the source participant.

5. The method of claim 1, further comprising receiving, from the source participant, a request to modify the set of privacy rules relative to the source participant, and modifying, by the server, the set of privacy rules in accordance with the request.

6. The method of claim 5, further comprising permitting, by the server, the source participant to modify only portions of the set of privacy rules relative to the source participant.

7. The method of claim 1, further comprising setting, by a centralized entity, a privacy rule in the set of privacy rules for each participant in the group communication session, the privacy rule for each participant in the group communication session different from the privacy rule for each other participant in the group communication session.

8. The method of claim 7, wherein the centralized entity is an initiating participant or a server and provides a default privacy rule for each participant, the method further comprising applying the default privacy rule to the source participant in response to determining that the participant did not provide its own privacy rule.

9. The method of claim 1, further comprising receiving, by the server, a privacy rule in the set of privacy rules from each participant in the group communication session.

10. The method of claim 9, wherein the source participant provides its privacy rule for the group communication session in a message used by the participant to request a floor.

11. The method of claim 1, the set of privacy rules further specifying whether, for each of a plurality of different sets of identity sharing circumstances, an identity of the source participant is to be shared or not shared with all other participants in the group communication session.

12. A server for administering a group communication session, the server comprising:
   a transceiver;
   a processor; and
   a memory storing a set of privacy rules for participants in the group communication session, the set of privacy rules specifying whether, for each of a plurality of different sets of identity sharing circumstances, an identity of a source participant is to be shared or not shared with other participants in the group communication session, the memory also storing instructions that, when executed by the processor, are configured to perform a set of functions comprising:
   receiving, via the transceiver, a first communication from the source participant in the group communication session;
   first accessing the set of privacy rues;
   responsive to the first accessing of the set of privacy rules and as a function of a first set of identity sharing circumstances, one of sharing and not sharing the identity of the source participant with the other participants and transmitting, via the transceiver, the first communication towards the other participants;
   receiving, via the transceiver, a second communication from the source participant in the group communication session;
   second accessing, by the server, the set of privacy rules;
   responsive to the second accessing of the set of privacy rules and as a function of a second set of identity sharing circumstances different from the first set of identity sharing circumstances, the other of sharing and not sharing, by the server, the identity of the source participant with the other participants and transmitting the second communication towards the other participants;

applying a default privacy rule to the source participant in response to determining that the participant did not provide its own privacy rule; and wherein different first and second sets of identity sharing circumstances include one or more of: whether a participant with special privileges has joined the group communication session, whether a participant or device with a specific function has joined the group communication session, whether a participant with a specific agency affiliation has joined the group communication session, and what type of media is being sourced by the source participant.

13. The server of claim 12, wherein the different first and second sets of identity sharing circumstances indicate whether to share or not to share the identity of the source participant with the other participants as a function of the type of media being sourced by the source participant, the type of media being selected from an audio stream, a video stream, an isolated image, and text.

14. The server of claim 12, wherein the set of privacy rules is set by an initiating participant of the group communication session, and the source participant is different from the initiating participant.

15. The server of claim 12, the functions further comprising receiving, via the transceiver and from the source participant, a request to modify the set of privacy rules relative to the source participant, and modifying, in the memory, the set of privacy rules in accordance with the request.

16. The server of claim 15, the functions further comprising permitting, by the server, the source participant to modify only portions of the set of privacy rules relative to the source participant.

17. The server of claim 12, the receiving, via the transceiver, a privacy rule in the set of privacy rules from each participant in the group communication session.

18. The server of claim 17, wherein the source participant provides its privacy rule for the group communication session in a message used by the source participant to request a floor.

19. The server of claim 12, the set of privacy rules further specifying whether, for each of a plurality of different sets of identity sharing circumstances, an identity of the source participant is to be shared or not shared with all other participants in the group communication session.

* * * * *